US008442848B2

(12) United States Patent
Myr

(10) Patent No.: US 8,442,848 B2
(45) Date of Patent: May 14, 2013

(54) AUTOMATIC OPTIMAL TAXICAB MOBILE LOCATION BASED DISPATCHING SYSTEM

(76) Inventor: David Myr, Jerusalem (IL)

( * ) Notice: Subject to any disclaimer, the term of this patent is extended or adjusted under 35 U.S.C. 154(b) by 170 days.

(21) Appl. No.: 13/043,537

(22) Filed: Mar. 9, 2011

(65) Prior Publication Data

US 2012/0232943 A1 Sep. 13, 2012

(51) Int. Cl.
*G06Q 50/00* (2012.01)
(52) U.S. Cl.
USPC .......................................................... 705/6
(58) Field of Classification Search ................. 701/200; 705/7.12, 26.41, 7.13, 7.22, 5–7.16; 715/764; 709/206
See application file for complete search history.

(56) References Cited

U.S. PATENT DOCUMENTS

| | | | |
|---|---|---|---|
| 6,741,921 B2 * | 5/2004 | Cohen et al. | 701/50 |
| 6,901,264 B2 * | 5/2005 | Myr | 455/456.5 |
| 2003/0007625 A1 * | 1/2003 | Pines et al. | 379/223 |
| 2008/0212763 A1 * | 9/2008 | Chandranmenon et al. | 379/211.01 |
| 2011/0099040 A1 * | 4/2011 | Felt et al. | 705/7.12 |
| 2011/0301985 A1 * | 12/2011 | Camp et al. | 705/5 |
| 2011/0307282 A1 * | 12/2011 | Camp et al. | 705/7.11 |
| 2011/0313804 A1 * | 12/2011 | Camp et al. | 705/7.13 |

* cited by examiner

*Primary Examiner* — James Trammell
*Assistant Examiner* — Michael D Lang

(57) ABSTRACT

The invention discloses a method and system for real-time automatic optimal dispatching of a plurality of taxicabs to passenger pick-up locations. The system uses optimization model to optimally dispatch taxicab vehicles in order to minimize total clients waiting time and to maximize taxicab business profitability. The optimization is performed based on the data on currently available taxicabs and their location, and based on the data on new clients orders and clients' pick-up locations, wherein the data on available taxicabs and their locations is obtained by the cell phone/GPS means from taxicab in-car devices and the data on clients' pick-up locations is obtained from clients cell phones/GPS-based devices.

10 Claims, 3 Drawing Sheets

Fig. 1 General System Overview
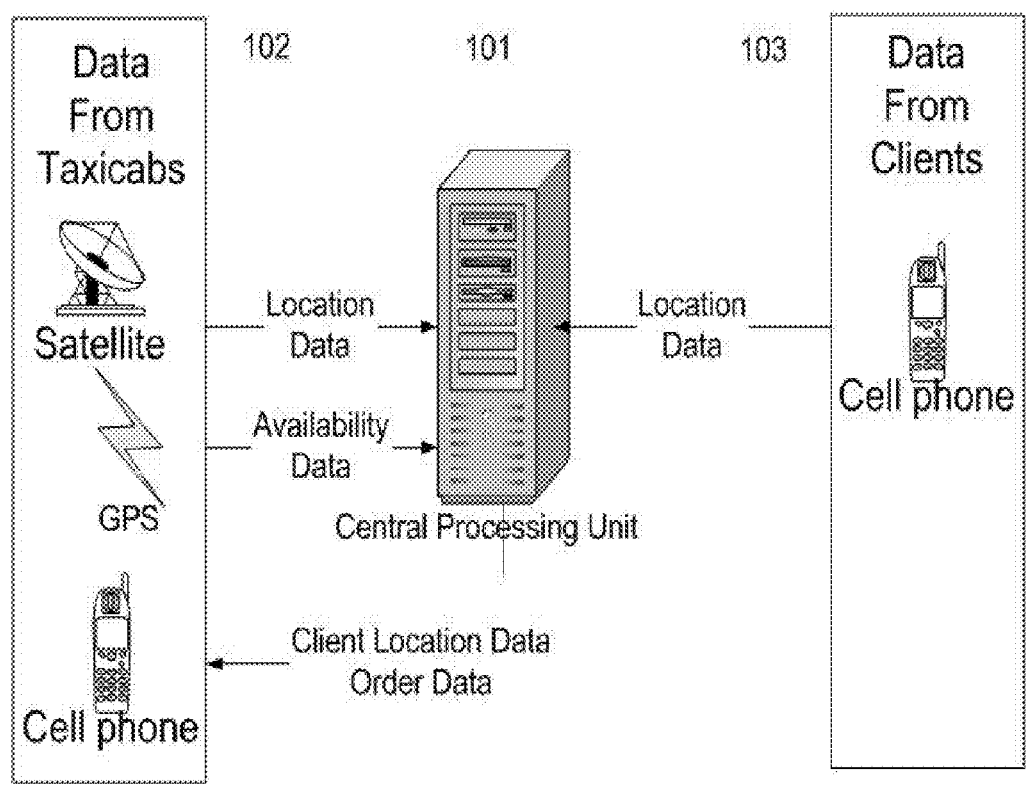

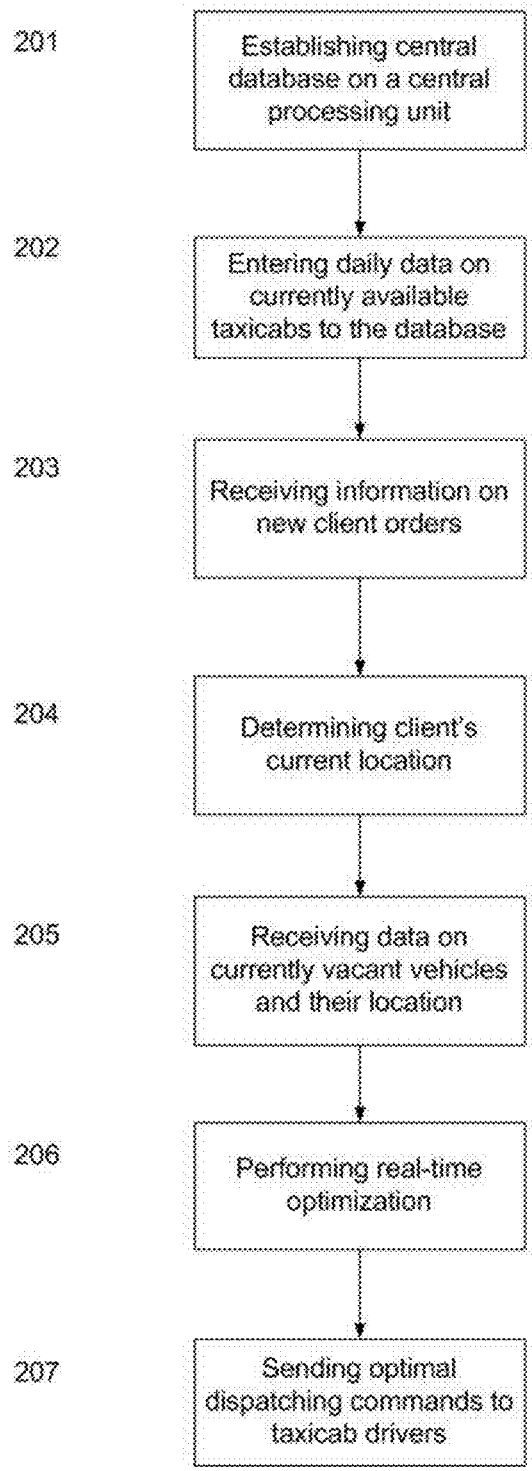

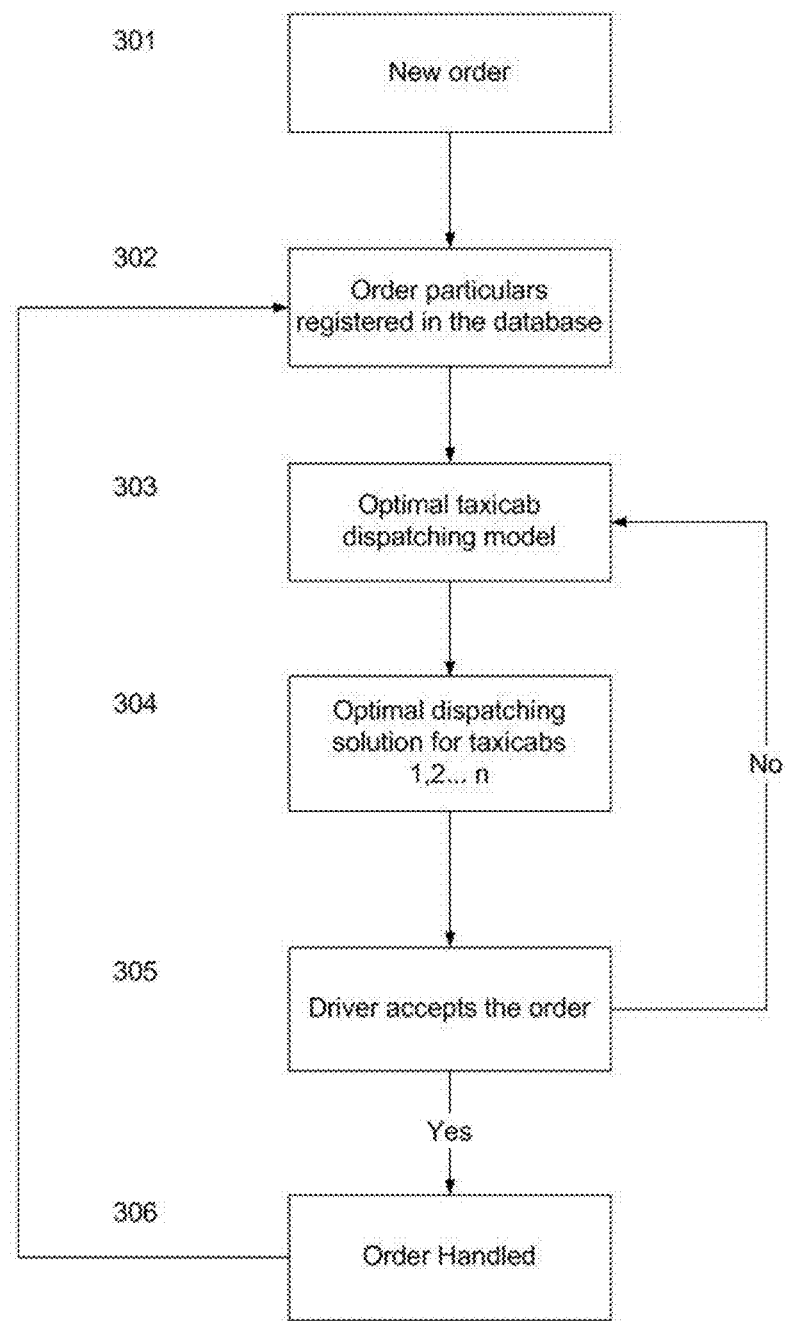
Fig. 3 Order Handling Process

AUTOMATIC OPTIMAL TAXICAB MOBILE LOCATION BASED DISPATCHING SYSTEM

DETAILED DESCRIPTION OF THE INVENTION

1. Field of the Invention

The present invention relates to the field of transportation services and more specifically to the field of optimal dispatching of a plurality of taxicab vehicles.

2. The State of Art and Background of the Invention

Recent technological developments allow for more advanced vehicle dispatching techniques. Those techniques are of a high importance, in particular, since it is possible to maximize taxicab business profitability while minimizing costs and improving clients experience.

Accordingly, there is a need for taxicab vehicle dispatching system capable of achieving optimal dispatching which can satisfy various restrictive conditions, such as times, quantity, designated locations, and forwarding locations. Transportation cost acts as one of the most important factors to consider particularly in a view of high fuel prices.

Due to a number of variables and restrictive conditions which must be considered prior to computing of the optimal taxicab dispatch schedule, the vehicle dispatching schedule has been usually established on the basis of field experiences of dispatchers rather than an optimal solution obtained by use of programming or a computer system, causing lower efficient vehicle dispatching and lower profitability.

Conventionally, taxi dispatching services comprise of a dispatching request to the taxi company, there are some cases in which that taxi company does not have a free taxi, and some cases in which it takes a long time until the taxi is dispatched, and the customer therefore has no alternative but to search once again for a taxi.

From the taxicab company's perspective, it would be also advantageous if a company could link its' customer service with a customer on a real-time basis without the need to have additional employees of the provider involved (e.g., central dispatchers), as the traditional taxi company services requires employment of an operator to provide the taxi dispatching information to drivers.

In this regard, currently some of conventional techniques propose employment of computerized systems for real-time vehicle dispatching.

Accordingly, there are needs of the improvement in a method and system for performing optimal vehicle dispatching using the modern telecommunication means and satellite tracking systems.

Some of the more advanced prior art systems propose employment of computer systems and satellite tracking systems for automated and real-time vehicle dispatching.

Chandranmenon in his US Patent Application 20080212763 "Network-based methods and systems for responding to customer requests based on provider presence information" discloses a system wherein communication connections may be established between customers and providers in real-time to enable customers to compare and select products and services offered by one or more providers faster than previously thought possible.

Furthermore, there are a number of prior art citations dealing more specifically with the transportation industry dispatching.

Lee in his U.S. Pat. No. 7,528,715 titled "Method for optimal multi-vehicle dispatch and system for the same" discloses a vehicle dispatching system that enables optimal dispatching of a plurality of vehicles with information of available vehicles from transportation company devices and information of orders from client devices under restrictive conditions such as vehicle sizes, minimum loading rates, and a maximum number of assignment locations, based on transportation regions preset in consideration of transportation times, past order quantities, and order congestion degrees, such that a relevant vehicle can perform delivery of freight within a predetermined transportation region to minimize a total transportation cost for each transportation region.

Sprigg in his U.S. Pat. No. 7,877,204 titled "System and method for sending destination locations to navigation devices" discloses a navigation device that receives a destination location to automatically calculate a route to the destination location over a wireless network wherein the navigation device uses the destination location to calculate a route which is communicated to the user with minimal to no user interaction. Multiple destinations may be sent to the navigation device, thus allowing advanced programming of an entire trip Pamminger in his U.S. Pat. No. 7,817,990 titled "Method of ordering location-specific services" A method of ordering location-specific services in which RFID or NFC interaction between an RFID or NFC-enabled portable device or a mobile telephone of a user, on the one hand, and a location and service-specific smartposter comprising at least one RFID or NFC label or tag or a location and service-specific RFID or NFC label affixed to an object such as a smartposter, on the other hand, is used to set up an activatable link to the portable device or mobile telephone. A connection to a server operated by the service provider is established following link activation. Location information relating to the RFID or NFC label is communicated to the service provider's server, the contents of the server page corresponding to the link depending on the location information transmitted by the RFID or NFC label. The user is then capable of ordering location-specific services after the connection has been set up Yaqub in U.S. Pat. No. 7,720,581 "Monitoring of vehicle conditions utilizing cellular broadcasts" describes a system and method for monitoring vehicle conditions via cellular networks. In some embodiments, a system for monitoring vehicle conditions is provided that includes at least one network information repository server having at least one database containing information related to vehicle conditions. The at least one network information repository server is configured to receive updates from mobile stations that perform a comparison of vehicle conditions based on actual information sensed by the mobile stations as compared to expected vehicle conditions and that upon identifying an inconsistency send an update to the network information repository server. Moreover, the network information repository server is configured to transmit updated information to a cellular network for broadcasting or multicasting to mobile stations or to send information via a cellular interface or wirelessly to mobile stations Umeda in US Patent Application 20060034201 "Taxi dispatching system and dispatching method" discloses a system wherein a taxi customer requests a taxi dispatch using a mobile phone. A control center acquires the request and authenticates the telephone number by an incoming call log thereof, and then sends an e-mail with a URL to the e-mail address of the taxi customer. The taxi customer accesses the URL and inputs dispatch conditions, and these dispatch conditions are distributed to a plurality of taxi drivers. The control center selects the optimal taxi based on the offer or bid from the taxi drivers that satisfies the dispatch conditions.

The present invention has been made in a view of the above and other problems, and it is an object of the present invention to provide an optimal taxi vehicle dispatching system, which minimizes a delivery distance of each vehicle, thereby reducing a total transportation cost and total waiting time for clients.

OBJECTS OF THE INVENTION

The present invention aims to overcome the shortcomings in the state of the art. Accordingly, it is an object of the invention to prevent a non-optimal use of taxicab resources.

It is the most important aspect of the invention to improve the level of service by minimizing the average taxi arrival waiting time.

It is a further object of the present invention to increase taxicab business overall profitability by minimizing transportation charges, fuel consumption and maximizing driver's work time efficiency.

Another object of an invention is to create a centralized taxicab management and control center.

BRIEF DESCRIPTION OF THE DRAWINGS

FIG. 1 presents a general overview of the system;

FIG. 2 illustrates data management and data flow in the disclosed system;

FIG. 3 presents a graphical overview of the new order handling process in the disclosed system.

DETAILED DESCRIPTION

The present invention will now be described more fully hereinafter with reference to the accompanying drawings, in which preferred embodiment of the invention is shown. The invention may, however, be embodied in many different forms and should not be construed as limited to the embodiment set forth herein; rather this embodiment is provided so that the disclosure will be thorough and complete, and will fully convey the scope of the invention to those skilled in the art. More particularly, the disclosed method and system may be implemented in different types of hardware on a programmable computer server having a processor, a data storage system, at least one input device and at least one output device.

In order to overcome the shortcomings of the prior art, this invention provides a real-time automated optimal taxicab dispatching system and method which allows for the optimized dispatching of taxicabs to client locations wherein the taxicabs could get automatically dispatched to pick up a passenger considering a variety of relevant input variables, constraints and objective function.

In the following discussion, numerous specific details are set forth to provide a thorough understanding of the present invention.

The general overview of the invented system is graphically illustrated in FIG. 1. The disclosed system includes an always-on network for communication between the central processing unit and the client's mobile devices/landline phone devices, and between the central processing unit and the taxicab driver's mobile devices. In this regard, the system is constructed to allow real-time automatic receipt and transmission of the data via a network communication system. Since the network is well known to those skilled in the art, detailed description thereof will be omitted herein.

Referring to FIG. 1, there is shown a simplified diagram of an always-on network which includes one or more taxicabs, one or more clients and network infrastructure/system. It should be understood that while only a single taxicab/client is shown, the network in fact comprises a number of taxicabs/clients.

In the disclosed invention a plurality of taxicabs are enrolled to the centralized dispatching service. Data on each taxicab in the centralized dispatching service is entered into the central database residing on the central processing unit (101). Each taxicab continuously transmits data to the central processing unit identifying its status as vacant (not currently serving any passengers), not-vacant (currently serving a passenger) or unavailable (when the driver is off-duty, due to cab repairs, etc.). When the taxicab driver starts his workday, he turns on his in-car mobile device, connects automatically to the network, and his status will be then registered by default as vacant. When the driver finishes his workday, he will turn off his in-car mobile device, disconnected from the network, and his status will be registered as unavailable.

Central processing unit further includes software code repository, including optimization model code; such central processing unit is capable of communicating with a set of input/output device(s), and with a memory. The interaction between a central processing unit, input/output devices, and a memory can be like that known in the art. The software can include a number of modules for implementing the steps of processes. Conventional programming techniques may be used to implement these modules. The computer instructions can be written in various programming languages.

Each taxicab enrolled into the system is equipped with portable mobile device (102), such as the mobile phone or GPS device, wherein a precise location of such a mobile device is available from the cellular network operator with an accuracy of several meters. Such current taxicab location information is transmitted to the central processing unit. Using the mobile device, taxicab continuously transmits data identifying its status as vacant, not-vacant or unavailable to the central processing unit. The client mobile device may include a number of features that allow the device to communicate with the always-on network infrastructure. These features may include "1-touch" button features wherein the client is able to activate applications stored within the device by simply pressing a single key or button on the device.

The taxi-dispatching center continuously updates data on available taxicabs and their locations and stores them in a database. After determining the client location data, the system searches the available (vacant and not-vacant) taxicabs database for a taxicab whose location is close to the client's location. The client location data is converted to an address and sent to the assigned taxicab.

A client requesting taxi service calls a taxi-dispatching center using a cellular phone (or any GPS-equipped device) or a landline phone (103).

FIG. 2 provides an illustration of the optimal taxicab vehicle dispatching process that can be used to implement computerized process steps of the invention.

A central database is established on a central processing unit and each taxicab in the centralized dispatching service is enrolled into the database (201).

Each day, a number of taxicabs may be unavailable for daily service due to repairs, driver's vacation, etc. At the start of each day, such data is entered into the database, and it is an additional input for the optimization model (202).

Information on new orders is received and updated continuously and the database is updated to contain all active orders (203).

Upon receiving an order from the client, the system determines his current location (204). An example to the method of determining such a precise location is disclosed in U.S. Pat.

No. 6,901,264 titled "Method and system for mobile station positioning in cellular communication networks" awarded and assigned to Makor Issues & Rights Ltd. The system of U.S. Pat. No. 6,901,264 enables to track and locate large quantities of anonymous mobile cell phones in any number of network cells to be used for real time traffic-forecasting systems, emergency services E911, and other client-initiated position requests. Location data thus obtained can be continuously updated from vehicular-based cellular phones, collected, processed and used as a basis for input to a number of intelligent transportation systems. The system is capable of covering large geographical areas and number of independent cell structures serving thousands of mobile cell phone clients.

The process of locating the client can be accomplished by a number of methods in some embodiments of the invention.

If the client's device is GPS-based, then his location could be determined according to GPS-based methodology.

If the client calls from the land-line telephone number, the system could use caller-ID to determine the originating telephone number and then cross-reference the telephone number against the street address stored in the public telephone directory.

In some embodiments of the invention, each client and/or each taxicab driver may be associated with some default preferences that may be stored on the central database.

Next, the system will receive data on the currently vacant taxicabs and their location (205). The location of each taxicab can be determined similarly to the abovementioned method of determining the client's location of the step 204.

Next, the real-time taxicab vehicle dispatching optimization will be performed under the various restrictive constrains (206). According to the main object of the invention, the optimization is performed in order to minimize total waiting time (a sum of all waiting times) of all taxicab clients, and the objective function is accordingly. In the presented invention, the optimal taxicab-dispatching model is a linear programming model, which comprises linear equations expressed by the restrictive conditions and an objective function, producing an optimal taxicab-dispatching solution by minimization of an objective function (obj) expressed by Equation 1, the objective function being directed to preferential employment of nearest taxicab vehicle, low transportation costs and flexibility in dividing the new clients orders between the taxicabs.

Lets now define by $X_i^j$ a decision variable in the optimization model: if vehicle i-th assigned to client j-th, then $X_i^j=1$, else $X_i^j=0$ Lets define distance (time) from taxicab i-th to client j-th by $D_i^j$; Let's define by $T_i^j$ a time from the destination of taxi i-th to the client j-th.

For currently not-vacant taxicabs, lets define by $t_i$ a time required to arrive from current location to the destination for currently not-vacant taxicab i-th (if taxicab receives a new order, he must taxicab finish his current order first and get his current client to the destination).

For currently vacant taxicabs, $t_i=0$.

Now, lets define by $D_i^j$ a total time needed to arrive from current location to the client pick-up location where $D_i^j = T_i^j + t_i$.

Now, we define by $M_i$ fees earned per fixed period by driver of the taxicab i-th.

To improve system flexibility and user-friendliness, we define by $w^C$, $w^D$ coefficients of importance (weights) of clients waiting time and equality drivers earned fee respectively. Those weights can be varied by the user according to his preferences. If, for a specific user, a total client waiting time is more important, he can place a bigger weight on $w^C$, if the equality of drivers earned fee is more important, then the bigger weight might be placed on $w^D$ (i.e., the driver who earned less fees could be assigned with handling a new order even if he will arrive to new client pick-up location later).

Now we construct the objective function is now constructed as:

$$\min \sum_{j=1}^{|C|} \sum_{i=1}^{|T|} X_i^j (w^C D_i^j + w^D M_i),$$ (Equation 1)

The optimization model is bound to the following constrains:

1. Maximum of one taxicabs can be sent to one client:

$$\sum_{i=1}^{|T|} X_i^j \leq 1, \forall j = 1, \ldots, |C|;$$

2. For one taxicabs no more than one client will be assigned:

$$\sum_{j=1}^{|C|} X_i^j \leq 1, \forall i = 1, \ldots, |T|;$$

3. Maximal number of clients and taxicabs must be matched, i.e. all clients must be picked up or, if currently there are more clients than vacant, then all the taxicabs must be occupied:

$$\sum_{i=1}^{|T|} \sum_{j=1}^{|C|} X_i^j = \min\{|C|, |T|\}$$

4. Maximal client waiting time is defined by:
$D_i^j X_i^j \leq W_T^{Max}$ where $W_T^{Max}$ is a maximal allowable waiting time (which is user-defined).

Proceeding to receiving the new order, the central processing unit transmits the order particulars (address in particular) to the driver's cell phone/mobile device. It is done by transmitting the package to the driver's mobile device (207).

New order handling process is graphically illustrated in FIG. 3. A client requesting taxi service calls a taxi dispatching center using his cellular phone/GPS-equipped location navigation device (301).

For an additional client convenience, a special customized device could be developed for the application for an easy ordering process. Lets suppose that such a device will be equipped with the "Taxi Order" button and when the client pushes the button, his order can be transmitted automatically to the central processing unit (302). Lets also suppose that such a device will be further equipped with the "Taxi Order Details" button for specifying order particulars (such as the client pick-up location, his designated location etc.)

A plurality of orders will be received at the central processing unit and the optimal taxicab-dispatching model will be performed (303).

As an output, an optimization model produces the optimal dispatching solution for all taxicabs available in the database (304).

When optimal dispatching solution is produced, a particular taxicab driver will be assigned with a particular new client order. Assume that the taxicab mobile device is equipped with the "Accept Order" button and with the "Refuse Order" button. Taxicab driver receives a request on their mobile device's displays. The mobile device asks if the driver would like to pick up this particular passenger at the specified location. If the driver accepts the order, he will send a confirmation message using his mobile device back to the central processing unit (305) and the order will be as indicated as handled in the central database (306).

If the driver does not accept the new order, he will send a message back to the central processing unit stating that. In such a case, an optimization model will be launched again in order to allocate an optimal taxicab to that specific client.

In some embodiments of the invention, the passenger may be notified that a taxicab is on its way, and an estimated time of arrival may be additionally shown.

Further Embodiments

The architectures, processes, and devices presented above are not exclusive. Other architectures and processes may also be derived in accordance with the principles of the invention to accomplish the same objectives. Further, the inventive principles may be advantageously employed in any other vehicle dispatching system for maximizing profits, accelerating and accurately guiding decision-making based on data accessed from a wide variety of information sources.

Those skilled in the art may implement modifications to the current design, without departing from the scope of the invention. Further, any of the functions provided by the system may be implemented in hardware, software or a combination of both.

What is claimed is:

1. An optimal taxicab dispatching system for optimally dispatching a plurality of taxicabs in a taxicab company to client pick-up locations in response to a request from a taxi client in which objective function based optimization is performed for a plurality of taxicabs located in one common geographical area in order to minimize company's total clients waiting time and to maximize taxicab company overall profitability, the system based on obtaining clients and taxicabs location based on mobile networks, comprising:
 a central processing unit including software code repository, including taxicab dispatching optimization model code, centralized taxicab database, an order information database, taxicab status information database, and a taxicab dispatching information database; such central processing unit is adapted to perform optimal taxicab dispatching based on the real-time optimization model performed under the various restrictive constrains; such central processing unit is capable of communicating with a set of input/output devices(s), and with a memory;
 an always-on network for communication between the central processing unit and the client's mobile/landline phone devices, and between the central processing unit and the taxicab driver's mobile devices;
 a set of client mobile and/or GPS-based devices to transmit new orders data to the central processing unit;
 a set of taxicab mobile and/or GPS-based devices to continuously transmit data on taxicab location and vacancy status;
 means for determining a location of taxicabs and taxi clients through mobile network positioning by obtaining cell phone positioning from a mobile network operator server or from the GPS; and
 an optimization engine to determine optimal total minimum clients waiting time for a taxicab company and maximal fees earned for a taxicab company, wherein an objective function of the optimization engine is constructed as:

$$\min \sum_{j=1}^{|C|} \sum_{i=1}^{|T|} X_i^j (w^C D_i^j + w^D M_i),$$

where C is a number of clients, T is a number of taxicabs, $X_i^j$ is a decision variable in the optimization model, $w^C$ and $w^D$ are coefficients of importance, $D_i^j$ is a total time needed to arrive from a current location to a client pick-up location, and $M^i$ are the fees earned per fixed period by the driver of the taxicab.

2. A system of claim 1, wherein the client mobile device is a cellular phone, PDA, laptop with wireless Internet connection or a GPS-based device.

3. A system of claim 1, wherein the taxicab mobile device is a cellular phone, PDA, laptop with wireless Internet connection or a GPS-based device.

4. The system of claim 1, wherein a plurality of taxicabs utilize an always-on wireless network to transmit a message identifying its status as vacant, not vacant or unavailable.

5. The system of claim 1, wherein the client mobile device is equipped with a "I-touch" "Taxi Order Details" order key button for quick ordering of the taxicab by pressing this key only, such a button being placed on the phone front panel, the said key button used for quickly specifying order particulars by one touch clicking on the key.

6. The system of claim 1, wherein the taxicab mobile device is equipped with a "Accept Order" key button for quick 1-touch approval of the incoming order, and with a "Refuse Order" key button for quick 1-touch notice of denial to take the incoming order, such buttons being placed on the taxi driver phone front panel, the said buttons used for quickly accepting or refusing the incoming order by one touch clicking on the key.

7. The system of claim 1 for automatic taxi cab ordering by cross-referencing telephone means, further comprising storing a landline telephone number of the taxicab customer in the central database; cross-referencing the telephone number of the taxicab customer who has requested a taxicab with home address associated with the said telephone number, using optimization model to determine which taxi cab is the optimal to send out for the given home address as per claim 1, and sending a taxicab to the said address according to the optimization model output.

8. An optimal taxicab dispatching mobile location-based method, comprising the steps of:
 a. establishing an initial centralized taxicabs database on a central processing unit;
 b. enrolling taxicabs into the centralized taxicabs database;
 c. obtaining data on current vacancy status of each taxicab in the database;
 d. obtaining data on new clients orders from clients mobile/GPS-enabled devices;
 e. obtaining data on location of the new clients using clients mobile/GPS-enabled devices using through mobile network positioning;
 f. launching the optimal taxicab-dispatching model and establishing an optimized taxicab dispatching work plan by linear programming model wherein the objective function being directed to minimizing taxicab company total clients waiting time through taking into consideration all taxicabs in a taxicab company and ensuring a preferential employment of nearest taxicab vehicle and lowering transportation costs, wherein the objective function is constructed as:

$$\min \sum_{j=1}^{|C|} \sum_{i=1}^{|T|} X_i^j (w^C D_i^j + w^D M_i),$$

where C is a number of clients, T is a number of taxicabs, $X_i^j$ is a decision variable in the optimization model, $w^C$ and $w^D$ are coefficients of importancy, $D_i^j$ is a total time needed to arrive from a current location to a client pickup location, and $M^i$ are the fees earned per fixed period by the driver of the taxicab;
   g. sending optimal dispatching command to currently vacant taxicabs.

9. The method of claim 8, wherein the step of establishing the optimized vehicle dispatching schedule is determined according to linear programming model including linear equations expressed by the restrictive conditions, and an objective function for minimization of the total transportation costs (fuel) and total waiting time for clients.

10. The method of claim 8, further comprising storing a landline telephone number of the taxicab customer in the central database; cross referencing the telephone number of the taxicab customer who has requested a taxicab with home address associated with the said telephone number and sending a taxicab to the said address according to the optimization model output.

* * * * *